US009578487B2

(12) United States Patent
Ganu et al.

(10) Patent No.: US 9,578,487 B2
(45) Date of Patent: Feb. 21, 2017

(54) METHOD AND SYSTEM FOR DYNAMIC DETERMINATION OF POTENTIAL ACCESS POINTS FOR PROPAGATING CLIENT INFORMATION

(71) Applicant: ARUBA NETWORKS, INC., Sunnyvale, CA (US)

(72) Inventors: Sachin Ganu, San Jose, CA (US); Juei Cheng Lo, Los Altos, CA (US); Rajini Balay, Fremont, CA (US); Partha Narasimhan, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 31 days.

(21) Appl. No.: 14/204,777

(22) Filed: Mar. 11, 2014

(65) Prior Publication Data
US 2014/0274037 A1 Sep. 18, 2014

Related U.S. Application Data

(60) Provisional application No. 61/785,001, filed on Mar. 14, 2013.

(51) Int. Cl.
*H04W 8/14* (2009.01)
*H04W 8/20* (2009.01)
*H04W 84/12* (2009.01)

(52) U.S. Cl.
CPC ............... *H04W 8/14* (2013.01); *H04W 8/20* (2013.01); *H04W 84/12* (2013.01)

(58) Field of Classification Search
CPC .......... H04W 8/14; H04W 8/20; H04W 84/12
See application file for complete search history.

(56) References Cited

U.S. PATENT DOCUMENTS

| 6,845,238 B1 * | 1/2005 | Muller | H04W 36/18 370/331 |
| 8,190,150 B1 * | 5/2012 | Miranda | H04W 12/06 455/404.2 |
| 2008/0299966 A1 * | 12/2008 | Masuda | H04L 63/08 455/432.1 |
| 2015/0092942 A1 * | 4/2015 | Wager | H04L 63/061 380/270 |

* cited by examiner

Primary Examiner — Chuong A Ngo
(74) Attorney, Agent, or Firm — Brooks, Cameron & Huebsch, PLLC

(57) ABSTRACT

A method includes determining a subset, of a set of access points, that a client device is likely to roam to from a first access point in the set of access points; transmitting to each of the subset of access points, without transmitting to a second access point in the set of access points that is not included in the subset, information associated with the client device; wherein the information associated with the client device is used by the client device or by the third access point during (a) an association process for the client device associating with the third access point or (b) an authentication process for the authentication of the client device by the third access point.

20 Claims, 4 Drawing Sheets

METHOD AND SYSTEM FOR DYNAMIC DETERMINATION OF POTENTIAL ACCESS POINTS FOR PROPAGATING CLIENT INFORMATION

BENEFIT CLAIM

This non-provisional application claims the benefit of provisional application Ser. No. 61/785,001 filed on Mar. 14, 2013, which is hereby incorporated by reference.

TECHNICAL FIELD

The present disclosure relates to dynamically determining a set of access points to which a client device may roam. In particular, the present disclosure relates to propagating information associated with a client device to the dynamically determined set of access point to which the client device may roam.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Client devices within WLANs communicate with access points to obtain access to one or more network resources. Access points are digital devices that may be communicatively coupled to one or more networks (e.g., Internet, an intranet, etc.). Access points may be directly connected to the one or more networks or connected via a controller. An access point, as referred to herein, may include a wireless access point (WAP) that communicates wirelessly with devices using Wi-Fi, Bluetooth or related standards and that communicates with a wired network.

A client device that is communicatively coupled to a first access point may switch to a second access point due to a change in location of the client device, failure of the first access point, a better signal strength for the second access point, or for any other reason. The second access point then determines whether or not to grant the client device access to one or more network resources via the second access point.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
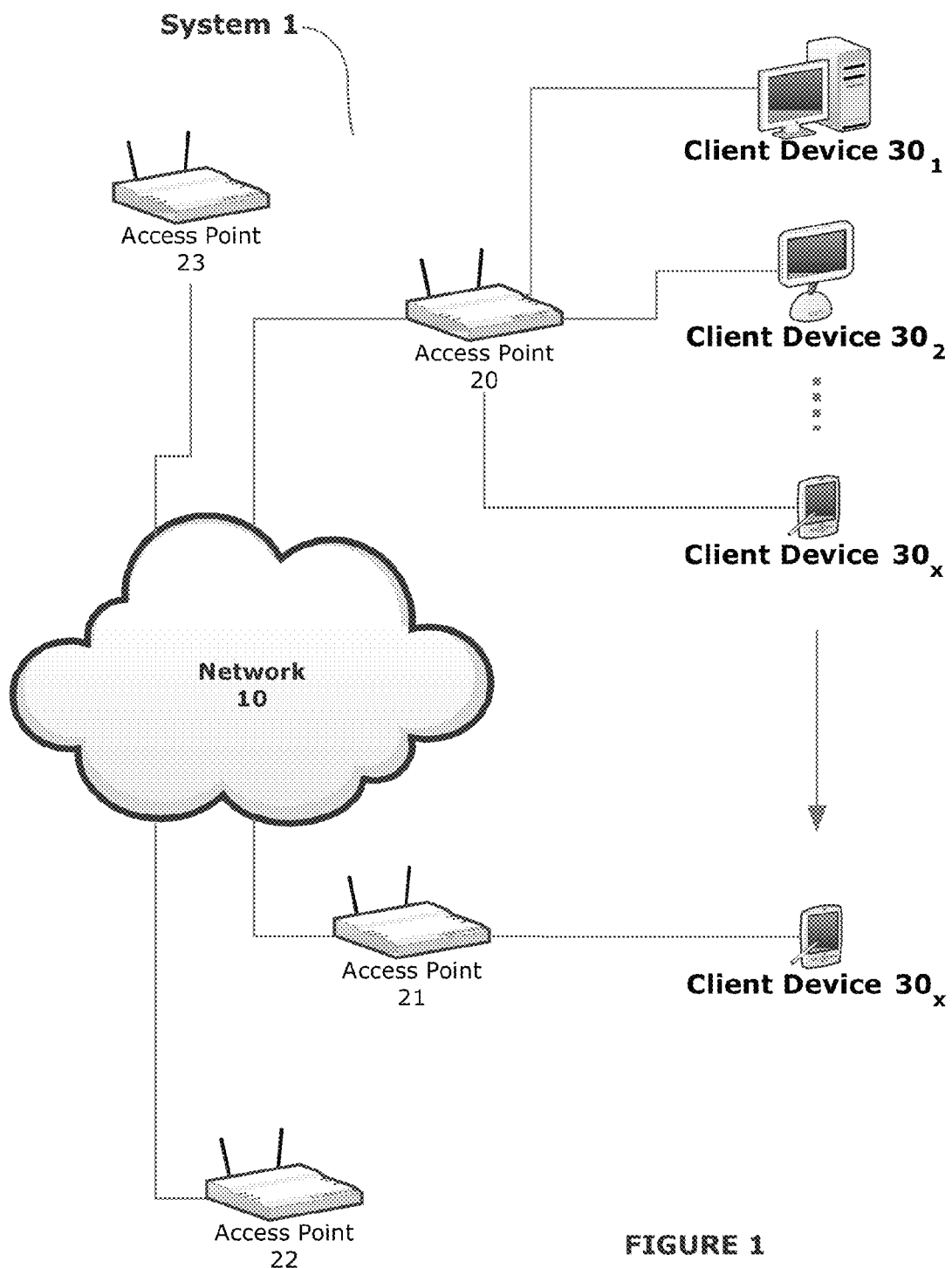
FIG. 1 shows a block diagram example of a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

General Overview

In one or more embodiments, a client device is associated with a first access point. Prior to a client device roaming to a different access point, a set of access points to which the client device may roam is identified. Information associated with the client device is propagated to the set of access points to which the client device may roam.

In an embodiment, the set of access points, in wireless communication with a particular access point with which a client device is associated, is identified as the set of access points to which the client device may roam. The set of access points may be identified based on the particular access point receiving wireless signals with a Signal-To-Noise ratio or an absolute signal strength above a particular threshold.

In an embodiment, the set of access points, which receive wireless signals from a client device while the client device is associated with a particular access point, is identified as the set of access points to which the client device may roam. The set of access points may be identified in response to receiving wireless signals, from the client device, with a Signal-To-Noise ratio or an absolute signal strength above a particular threshold information for client devices is stored in a distributed set of nodes (for example, a distributed hash table) that is keyed based on client device identifiers corresponding to the client devices. In one example, upon authentication of a client device by a RADIUS server, a first network device determines a particular node in a distributed set of nodes, based on a client device identifier, to store state information for the client device. State information (for example, authentication information, firewall session information, multicast information, gateway information, and/or optimization information) for the client device is stored on the particular node. Alternatively, or in addition, identification, of another network device which stores at least a portion of the state information for the client device, is stored on the first node.

In one or more embodiments, nodes of a distributed set of nodes are (a) selected based on client device identifiers and (b) queried for information associated with client devices corresponding to the client device identifiers. In one example, a client device, which was previously associated with a first access point, requests association with a second access point. The second access point (or other network device such as a controller) determines a MAC address of the client device from the association request and applies a hash function to the MAC address to compute a hash value. The second access point identifies a particular node in a distributed hash table that is associated with the hash value and obtains from the particular node (a) authentication information such as a shared key from prior authentication (s) of the client device and (b) an identification such as an IP address of a network device which stores additional information for the client device. Based on the information, the access point communicates with the client device to create at least one encryption key for encrypting communication between the access point and the client device. Furthermore, while the at least one encryption key is being created, the additional information for the client device is obtained from the network device based on the IP address. In this example, the additional information may include multicast information identifying the multicast subscriptions for the client device. The concurrent creation of the encryption keys and obtaining of the multicast information allows the second access point to quickly resume the multicast subscriptions for the client device.

Architectural Overview

FIG. 1 shows a block diagram example of a system which includes digital devices in accordance with one or more embodiments. In one or more embodiments, System 1 may include more or less digital devices, than the devices illustrated in FIG. 1.

The term "digital device" generally refers to any hardware device that includes a processor. When the digital device is adapted for communications with a network, the digital device may be configured as a network device, a client device, or both. A digital device may refer to a physical controller device or a hardware device executing a virtual controller.

A digital device may be a network device and/or a client device. A "network device" is a digital device that may be configured to provide a network service. A "client device" is a digital device that may be configured to receive a network service. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant "PDA", a wireless receiver and/or transmitter, an access point, a base station, a communication management device, a router, a switch, and/or a controller.

System 1, as illustrated in FIG. 1, is a system that includes a network 10 (for example, a Local Area Network, a Wide Area Network, the Internet, Intranet, etc.), an access point 20, an access point 21, access point 22, access point 23, and a set of client devices $30_1$-$30_x$. The access points are communicatively coupled to the network 10 via a transmission medium to send and receive data. The transmission medium may be a wired or a wireless connection. Access points 20-23 may be on a same network or different networks. Access points 20-23 may be on the same Internet Protocol Subnet or different Internet Protocol Subnets. In an example, System 1 may include one or more controllers (not shown) which are configured to communicate with one or more access points (for example, access points 20-23) within System 1. The controller links one or more of access points 20-23 to network 10. In another example, two separate controllers link access point 20 and access point 21 to network 10.

In one or more embodiments, access points 20-23 each correspond to a network device such as a wired access port, a wireless access port, a switch, a router, or any combination thereof. An access point communicatively couples a client device to one or more other devices and/or resources within System 1. The access point 20 is configured to forward data to or data from the client devices $30_1$-$30_n$.

In an embodiment, the client devices $30_1$-$30_n$ are digital devices that include a processor, memory, and input/output (I/O) interfaces including a wireless interface such as an IEEE 802.11 wireless interface. The wireless interface may be used to communicate with the access point 20 to obtain access to devices and/or resources within System 1. The client devices $30_1$-$30_n$ may be wireless electronic devices that are capable of receiving application data, configuration data, voice data streams, video data streams, or any other type of data. Examples of client devices include personal computers, laptop computers, netbook computers, wireless music players, portable telephone communications devices, smart phones, tablets, and digital televisions.

In an embodiment, each client device is associated with a client device identifier. The client device identifier refers to any information that is associated with a client device and is persistent as the client device connects to different access points (for example, access point 20 and access point 21). An example of a client device identifier is a Media Access Control (MAC) address of a client device. In another example, a client device identifier corresponds to an identification number assigned to each device used in an enterprise network by a system administrator or automatically by a device registration application.

Figure 2:
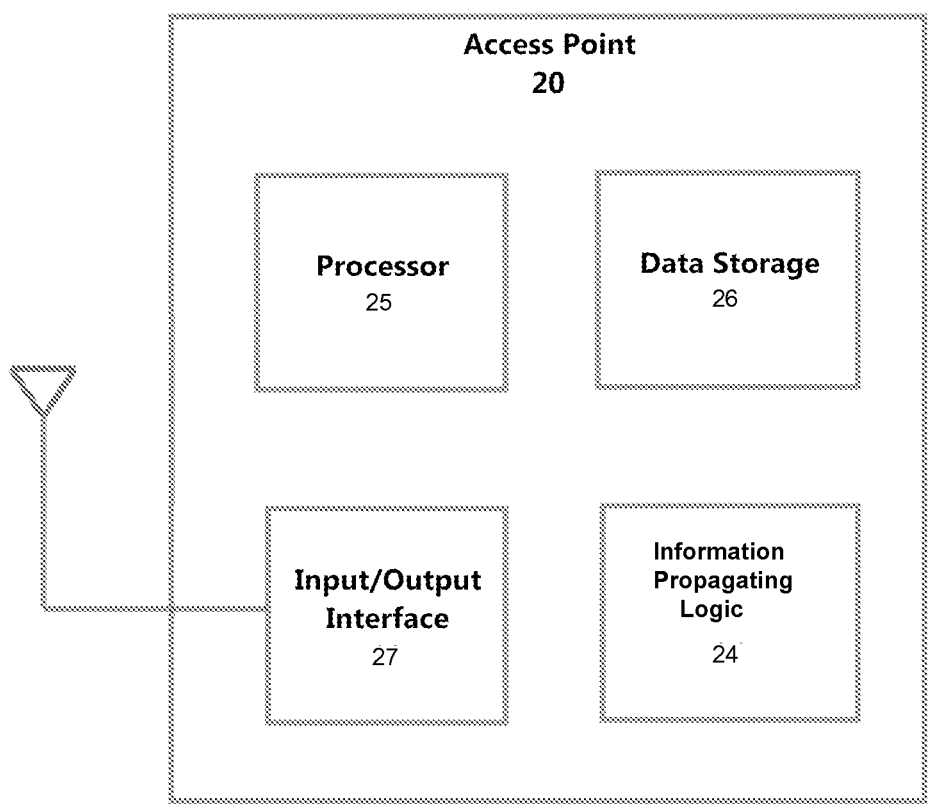
FIG. 2 shows a block diagram example of an access point in accordance with one or more embodiments.

In an embodiment, access point 20, a controller associated with access point 20, or another device stores information associated with client device $30_x$. The information associated with a client device may include but is not limited to one or more of:

a. Authentication Information—Information related to, used in, or generated during prior authentications of the client device; Information to be used in a future authentication of the client device.

b. Encryption Key Information—Information related to encryption keys used for encrypting data received by the client device or data sent by the client device.

c. Multicast Information—Information related to multicasts received by the client device.

d. Optimization Information—Information related to the configuration of the client device or configuration of access points in communication with the client device for optimal performance.

e. Firewall Session Information—Information related to a firewall session defining acceptable data sources or data types for the client device.

f. Gateway Information—Dynamic Host Configuration Protocol (DHCP) parameters used for an access point when communicatively coupling the client device to one or more resources on a network.

g. Fast Roaming Information—Keys for Opportunistic Key Caching (OKC) as defined under IEEE 802.11 Access Points FIG. 2 shows a block diagram example of access point 20 in accordance with one or more embodiments. One or more steps described herein as being performed by an access point, may be performed by another network device such as a controller. Furthermore, one or more components described herein as being implemented within an access point may be implemented within another network device such as a controller. Access points within System 1 may be configured similarly or differently than access point 20. Access point 20 is a network device that comprises one or more of: a processor 25, data storage 26, an I/O interface 27, and an information propagating logic 24.

The data storage 26 of the access point 20 may include a fast read-write memory for storing programs and data during the access point 20's operations and a hierarchy of persistent memory such as ROM, EPROM, and Flash memory for storing instructions and data needed for the startup and/or operations of access point 20. The data storage 26 stores data that is to be transmitted from the access point 20 or data that is received by access point 20. In an embodiment, the data storage 26 is a distributed set of data storage components.

In an embodiment, the I/O interface 27 corresponds to one or more components used for communicating with other devices via wired or wireless segments. The I/O interface 27 may include a wired network interface such as an IEEE 802.3 Ethernet interface and/or a wireless interface such as an IEEE 802.11 WiFi® interface (WiFi® is a registered trademark of WiFi Alliance).

The processor 25 is coupled to the data storage 26 and the I/O interface 27. The processor 25 may be any processing device including, but not limited to a MIPS-class processor, a microprocessor, a digital signal processor, an application specific integrated circuit, a microcontroller, a state machine, or any type of programmable logic array.

In an embodiment, the information propagating logic 24 includes one or more functional units implemented using firmware, hardware, software, or a combination thereof for dynamically determining a set of access points for propagating information associated with a client device. Although, the information propagating logic 24 is shown as implemented on access point 20, one or more physical or functional components of the information propagating logic 24 may be implemented on a separate device(s). In an example, the information propagating logic 24 may be implemented on a controller (or any other device) in communication with one or more of the access points 20-23. The individual functional components of the information propagating logic 24 are described below with Reference to FIG. 3.

Information Propagating Logic

Figure 3:
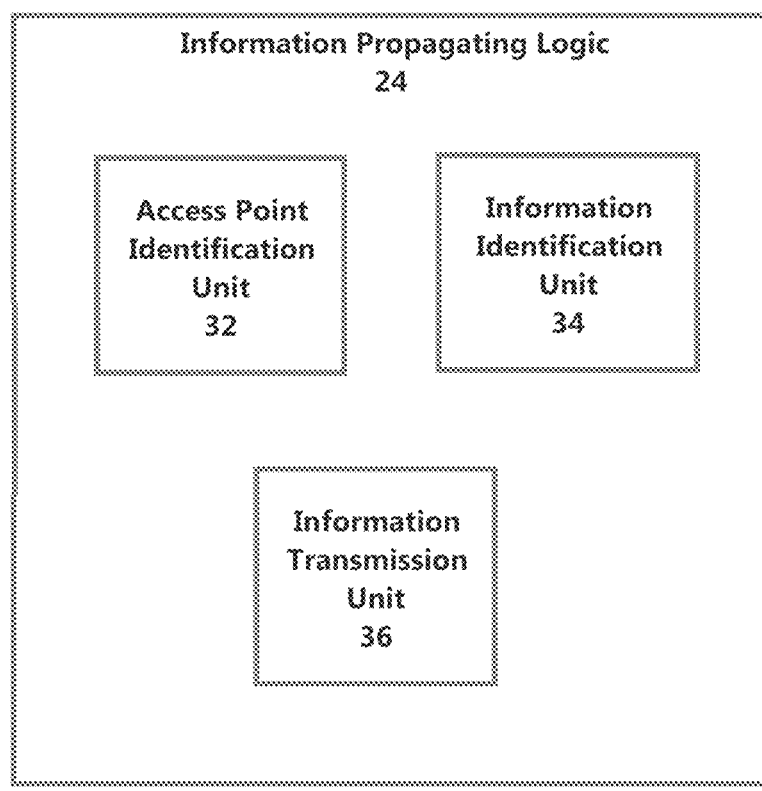
FIG. 3 illustrates an example of an information propagating logic in accordance with one or more embodiments.

FIG. 3 illustrates an example of information propagating logic 24 in accordance with one or more embodiments. The information propagating logic 24 includes functional units implemented using firmware, hardware, software, or a combination thereof. In one or more embodiments, the information propagating logic 24 is implemented with functional units including an access point identification unit 32, information identification unit 34, and an information transmission unit 36. Components and functionalities described with reference to a particular functional unit may instead be implemented within another functional unit. Furthermore, two or more functional units may be combined into a single program or single device. A single functional unit may be implemented by multiple devices or multiple applications that each performs a portion of the functions described herein.

An access point identification unit 32 includes functionality to identify a set of access points to which a client device may roam. The access point identification unit 32 may communicate with any of access points 20-23 or with a client device to obtain information which may be evaluated to determine the set of access points to which the client device may roam. In an example, the access point identification unit 32 determines that client device $30_x$ currently associated with access point 20 is likely to roam to access point 21 or access point 23, but not likely to roam to access point 22 based on a proximity to access point 20. In another example, the access point identification unit 32 determines that client device $30_x$ currently associated with access point 20 is likely to roam to access point 21 or access point 22, but not likely to roam to access point 23 based on an estimated direction of travel of client device $30_x$.

The information identification unit 34 includes functionality to determine a set of information associated with the client device (described above). The information identification unit 34 may continuously, periodically, or in response to an event, determine the set of information associated with the client device. The information identification unit 34 may aggregate the information or simply determine where the information is located.

The information transmission unit 36 includes functionality to transmit the set of information associated with the client device to each of the set of access points to which a client device may roam. The information transmission unit 36 may include functionality to transmit the information associated with the client device in response to a triggering event or periodically. The information transmission unit 36 may transmit instructions to other devices, storing the information associated with the client device, to transmit the information to each of a set of client devices to which a client device may roam.

The operations that may be performed by the information propagating logic 24 (or other functional units within the system) for granting access to a client device are described below with reference to FIG. 4.

Propagating Information Associated with a Client Device

Figure 4:
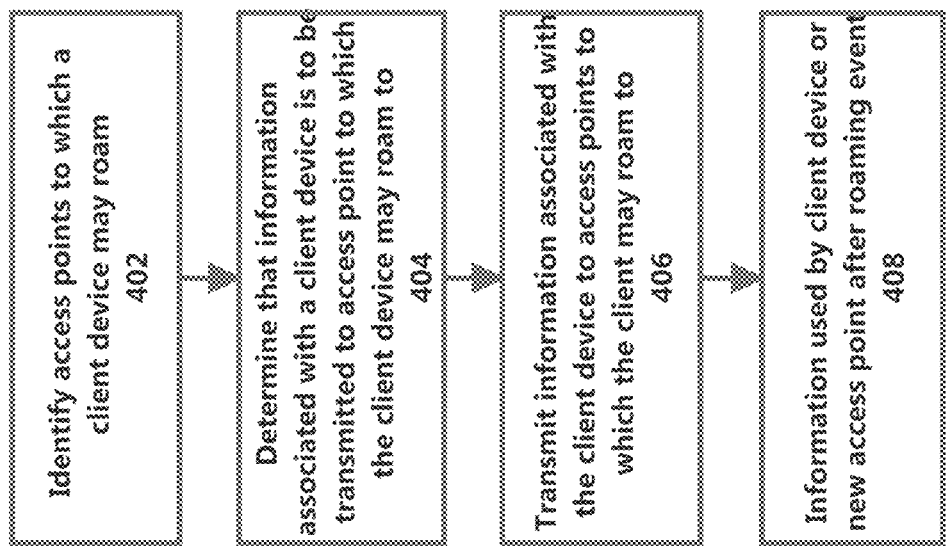
FIG. 4 illustrates an example method for propagating information associated with a client device in accordance with one or more embodiments.

FIG. 4 illustrates an example method for propagating information associated with a client device. One or more operations illustrated in FIG. 4 may be modified, rearranged, or omitted all together. Accordingly, the particular sequence of operations illustrated in FIG. 4 should not be construed as limiting the scope of one or more embodiments.

Initially, a client device is associated with a particular access point. While the client device is associated with the particular access point, other access points to which the client device may roam are identified (Operation 402).

In an embodiment, a set of access points to which the client device may roam is identified based on the particular access point to which the client is currently associated. In an example, access points that are nearby the particular access point are identified in the potential set of access points. The set of nearby access points may be determined based on a detection of each of the set of the nearby access points by the particular access point. A second access point may be determined to be a nearby access point responsive to the particular access point receiving a wireless signal from the second access point with (a) a Signal-To-Noise ratio above a particular threshold and/or (b) an absolute signal strength above a particular threshold. The received wireless signal may, for example, (a) include a beacon frame, (b) be an ACK frame received in response to a wireless signal transmitted to the particular access point, or (c) be directed to another device and snooped by the first access point.

In an embodiment, the potential set of access points to which the client device may roam may be determined based on information collected by each of the potential set of access points. In an example, each access point may collect information on a set of client devices that are detected by that access point. The access point detects client devices based on received wireless signals and records for the detected client devices a corresponding Signal-To-Noise ratio or an absolute signal strength of wireless signals received by the access point from the client device. The received wireless signals may include probe requests, data frames, management frames, or any other information. In an example, a client device transmits probe requests, across many different wireless channels, that are received by a plurality of access points. Based on the received probe requests, each access point maintains a respective list of client device identifiers, a signal strength of received wireless signals, and a timestamp indicating when the wireless signals were received.

In an example, the access point records information for client devices if the Signal-To-Noise ratios of received signals received from the client device is above a particular Signal-To-Noise ratio threshold. The recorded information for a client device may include a timestamp of the time at which the wireless signal was received.

In an embodiment, information received for each client device from different access points may be aggregated to generate a client record. In an example, the client record indicates a list of access points which received wireless signals from a particular client device, a signal strength of received wireless signals, a Signal-to-Noise ratio of the received wireless signals, and/or a time at which the wireless signals were received.

In an embodiment, the potential set of access points to which the client device may roam may be based on historical data. In an example, a user of a client device takes the client device to a Fish Bowl conference room every Tuesday at 10 am wherein the client device connects to the access point in the Fish Bowl conference room (or to one of a set of access points in the vicinity of the Fish Bowl conference room). Based on this usage pattern, the potential set of access points to which the client device may roam to on Tuesday mornings at 10 am includes the access point in the Fish Bowl conference room (or includes the set of access points in the vicinity of the Fish Bowl conference room). In another example, lunch guests at a corporation bring client devices that first connect to an access point located in a lobby of an office building. Thereafter, the client devices connect to an access point located in a cafeteria of the office building. Based on this historical trend, a determination is made that client devices first connecting to the access point in the lobby around lunch time will likely roam to the access point in the cafeteria. Accordingly, a potential set of access points to which a client device may roam to may be determined based on a historical usage of that client device itself or based on a historical usage of a set of client devices with similar characteristics.

In an embodiment, the potential set of client devices to which the client device may roam may be based on administrator configured rules. In an example, a casino administrator may indicated that client devices connected with an access point on a casino floor will likely roam to an access point near a cashier. The trend of client devices roaming from an access point on the casino floor to an access point near a cashier may also be determined based on historical connectivity data.

In an embodiment, while the client device is associated with the particular access point, a determination is made that information associated with the client device is to be transmitted to access points to which the client device may roam to (Operation 404).

In an embodiment, the determination that the information is to be transmitted may be made based on a periodic basis such that information associated with the client device is periodically transmitted to a dynamically determined set of access points to which the client device may roam to.

In an embodiment, the determination that the information associated with a client device is to be transmitted is based on a triggering event. Examples of triggering events include but are not limited to one or more of:

a. Detecting a decrease in signal strength of wireless signals transmitted between the client device and an access point with which the client device is currently associated;

b. Detecting an increase in signal strength of wireless signals transmitted by the client device and detected by an access point with which the client device is not currently associated;

c. Determination that an association between the client device and a particular access point is to be terminated (for example, for load balancing purposes, improving signal quality, etc.)

d. A historical trend associated with the client device itself that is likely to roam to another access point;

e. A historical trend associated with client devices with similar characteristics as the client device that is likely to roam to another access point;

In an embodiment, while the client device is associated with the particular access point and in response to the determination that information associated with the client device is to be transmitted to access points to which the client device may roam to: the information associated with the client device is transmitted to the access points to which the client device may roam to (Operation 406). The information associated with the client device, that is received by an access point to which the client device may roam, is used by that access point and/or transmitted to the client device for use by the client device (Operation 408).

In one example, while a client device is associated with a first access point of a set of five access points, a determination is made that the client device is likely to roam to a second access point or a third access point, and not as likely to roam to a fourth access point or a fifth access point. The determination is made based on the second access point and third access point detecting probe requests, transmitted by the client device, at a Signal-To-Noise ratio above a particular threshold. The fourth access point and the fifth access point fail to receive the probe requests at a Signal-To-Noise ratio above the particular threshold. Based on the determination, while the client device is associated with the first access point, information for deriving an encryption key is transmitted to the second access point and the third access point. Subsequent to transmission of the information, the client device roams away from the first access point and initiates a process for associating with the second access point. During the process, the second access point transmit the information for deriving an encryption key, that was received from the first access point (or from a controller) to the client device. The client device uses the information to derive an encryption key and encrypt packets transmitted to the second access point. In other examples, the information associated with the client device may be used to establish firewall sessions, resume streaming of data, resume multicast subscriptions, etc.

In an embodiment, information that is sent to a particular access point that is no longer (but used to be) one of the access points to which the client device may roam is deleted from the particular access point. In an example, when a newly determined set of access points to which a client device may roam is compared to a previously determined set of access points to which the client device may roam. A particular access point that was in the previously determined set is not included in the newly determined set. In response to the particular access point not being included in the newly determined set, the particular access point is notified that the previously sent information associated with the client device may be deleted.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause the one or more hardware processors to:
   generate a client record based on access points that a client device has historically roamed to;
   determine a subset of a plurality of access points that the client device is likely to roam to from a first access point in the plurality of access points based on the client record;
   detect a triggering event based on a network condition;
   in response to a detection of the triggering event, transmit to each of the subset of access points that the client device is likely to roam to from a first access point, without transmitting to other access points that are not included in the subset, information associated with the client device;
   wherein the transmitting operation is performed while the client device is associated with the first access point.

2. The non-transitory computer readable medium of claim 1, wherein the information associated with the client device comprises information used to derive an encryption key to encrypt data transmitted by the client device to the first access point.

3. The non-transitory computer readable medium of claim 1, wherein the subset of access points is determined based on wireless signals received by the first access point from each of the subset of access points.

4. The non-transitory computer readable medium of claim 1, wherein detecting the triggering event based on the network condition includes detecting a decrease in signal strength of signals transmitted between the client device and the first access point.

5. The non-transitory computer readable medium of claim 1, wherein detecting the triggering event based on the network condition includes detecting an increase in signal strength of signals transmitted by the client device and detected by a second access point with which the client device is not currently associated.

6. The non-transitory computer readable medium of claim 1, wherein detecting the triggering event based on the network condition includes detecting that the client device is no longer associated with the first access point.

7. The non-transitory computer readable medium of claim 1, wherein detecting the triggering event based on the network condition includes detecting a historical roaming trend of devices similar to the client device.

8. A system comprising:
   at least one device comprising a hardware processor and a memory storing instructions that when executed by the hardware processor cause the hardware processor to:
   determine a subset of a plurality of access points that a client device is likely to roam to from a first access point in the plurality of access points based on a historical usage of a set of client devices with a set of characteristics similar to a set of characteristics associated with the client device;
   detect a triggering event based on a network condition;
   in response to a detection of the triggering event, transmit to each of the subset of access points that the client device is likely to roam to from a first access point, without transmitting to other access points that are not included in the subset, information associated with the client device;
   wherein the transmitting operation is performed while the client device is associated with the first access point.

9. The system of claim 8, wherein the information associated with the client device comprises information used to derive an encryption key to encrypt data transmitted by the client device to the first access point.

10. The system of claim 8, wherein the subset of access points is determined based on wireless signals received by the first access point from each of the subset of access points.

11. The system of claim 8, wherein detecting the triggering event based on the network condition includes detecting a decrease in signal strength of signals transmitted between the client device and the first access point.

12. The system of claim 8, wherein detecting the triggering event based on the network condition includes detecting an increase in signal strength of signals transmitted by the client device and detected by a second access point with which the client device is not currently associated.

13. The system of claim 8, wherein detecting the triggering event based on a network condition includes detecting that the client device is no longer associated with the first access point.

14. The system of claim 8, wherein detecting the triggering event based on the network condition includes detecting a historical roaming trend of devices similar to the client device.

15. A method comprising:
   generating a client record based on access points that a client device and at least one device similar to the client device have historically roamed to;
   determining, by a hardware processor, a subset of a plurality of access points that the client device is likely to roam to from a first access point in the plurality of access points based on the client record;
   detecting, by the hardware processor, a triggering event based on a network condition;
   in response to the detection of the triggering event, transmitting to each of the subset of access points that the client device is likely to roam to from a first access point, without transmitting to other access points that are not included in the subset, information associated with the client device;
   wherein the transmitting operation is performed while the client device is associated with the first access point.

16. The method of claim 15, wherein the subset of access points is determined based on wireless signals received by the first access point from each of the subset of access points.

17. The method of claim 15, wherein detecting the triggering event based on the network condition includes detecting a decrease in signal strength of signals transmitted between the client device and the first access point.

18. The method of claim 15, wherein detecting the triggering event based on the network condition includes detecting an increase in signal strength of signals transmitted by the client device and detected by a second access point with which the client device is not currently associated.

19. The method of claim 15, wherein detecting the triggering event based on the network condition includes detecting that the client device is no longer associated with the first access point.

20. The method of claim 15, wherein detecting the triggering event based on the network condition includes detecting a historical roaming trend of devices similar to the client device.

* * * * *